Feb. 28, 1933.   W. H. SCHULZE   1,899,295
FUEL PUMP
Filed Dec. 10, 1927   2 Sheets-Sheet 1
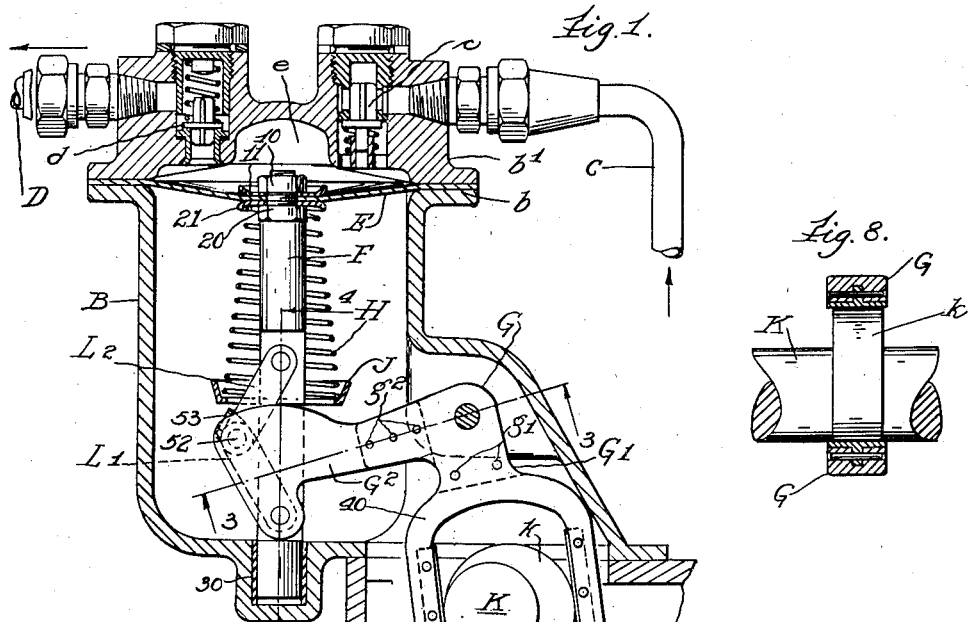
Fig. 1.
Fig. 8.
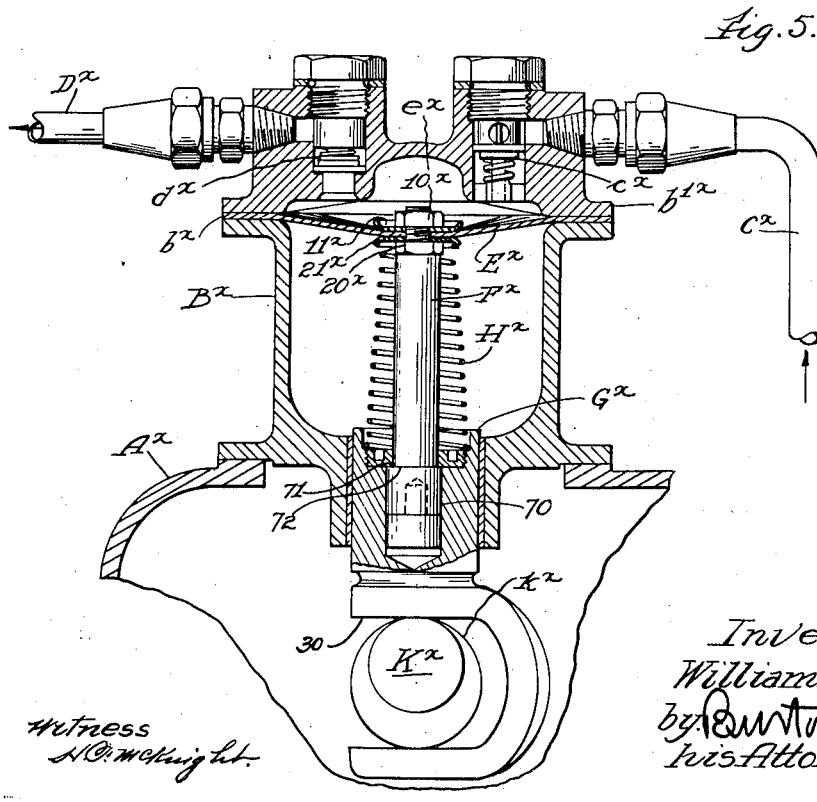
Fig. 5.
Inventor
William H. Schulze
by Burton Burton
his Attorneys.
Witness
H. C. McKnight

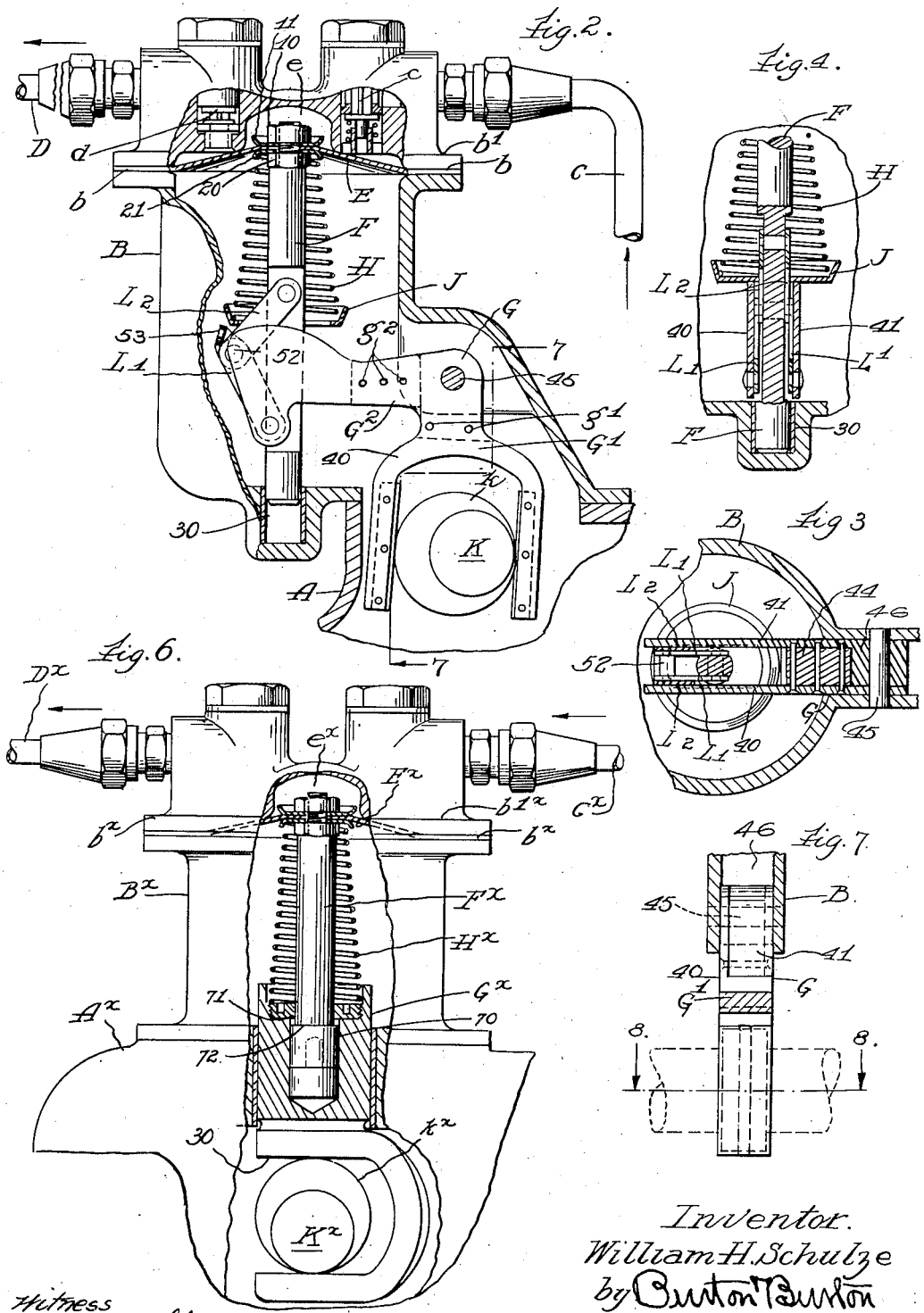

Patented Feb. 28, 1933

1,899,295

UNITED STATES PATENT OFFICE

WILLIAM H. SCHULZE, OF CHICAGO, ILLINOIS, ASSIGNOR TO STEWART-WARNER CORPORATION, OF CHICAGO, ILLINOIS, A CORPORATION OF VIRGINIA

FUEL PUMP

Application filed December 10, 1927. Serial No. 239,043.

The purpose of this invention is to provide an improved construction of a pump particularly designed for furnishing fuel to an internal combustion engine. It consists in the elements and features of construction shown and described as indicated in the claims.

In the drawings:—

Figure 1 is a section axial with respect to the pumping element of a device embodying this invention in one form, showing the same mounted upon the engine body.

Figure 2 is a similar view showing the parts in different position from Figure 1.

Figure 3 is a detail section at the line 3—3 on Figure 1.

Figure 4 is a detail section at the line 4—4 on Figure 1.

Figure 5 is a view similar to Figure 1 showing the invention in modified form.

Figure 6 is a view similar to Figure 5 showing the parts in a different position from Figure 5.

Figure 7 is a detail section at the line 7—7 on Figure 2.

Figure 8 is a section at the line 8—8 on Figure 7.

In the construction shown in Figures 1, 2, 3 and 4, A is the engine body casing; B is the pump casing; C is the fuel inflow pipe; D is the fuel delivery pipe; $c$ is a check valve in the fuel inflow pipe opening for inflow and seating against backflow from the pump chamber; $d$ is the check valve in the fuel discharge pipe opening for outflow and seating against backflow toward the pump chamber. E is a diaphragm which is clamped at its margin between the main portion, $b$, of the pump casing and the cap, $b^1$, partitioning off from the total cavity of the pump casing a chamber, $e$, at one side of which are located the fuel inflow and outflow connections with the valve, as described. F is a plunger positively connected to the diaphragm for movement therewith in both directions, connection being made by means of nuts, 10 and 20, on the threaded end of the plunger at opposite sides of the diaphragm with suitably dished washers, 11 and 21, interposed between the nuts and the diaphragm. For guidance of the opposite end of the plunger a slide bearing for that end is provided at 30 in the lower side of the pump casing. For actuating the plunger, and thereby the diaphragm (in one direction only, as hereinafter explained) there is provided a lever, G, fulcrumed in the casing having one arm, $G^1$, extending out from the pump casing and into the engine casing for engagement in the latter by a moving part of the engine, the engagement shown being by means of a cam, $k$, on a rotating shaft of the engine, as the timer shaft, K. The lever arm, $G^1$, is forked for engaging the cam at both sides, so that the lever shall be actuated positively in both directions in the rotation of the shaft, K. The other arm, $G^2$, of the lever, G, is connected with the plunger, F, by linkage constituting means for lost motion between the lever and the plunger. As illustrated, and desirably, the lever arm, $G^2$, is forked at the end for extending past the plunger at both sides of the latter. A convenient method of constructing the lever, G, forked at one end for embracing the plunger, F, and forked at the other end for spanning the cam, $k$, is shown consisting in making a part, 40, having one arm of the plunger-embracing fork and having both arms of the fork for spanning the cam, and providing another part, 41, having the other arm of the plunger-embracing fork and extending transversely across the fork gap at the fulcrum of the lever, as seen at 46, a spacer being interposed between the two parts in the horizontal arm of the lever, as seen at 44, and all parts of the lever being secured together by rivets, as seen at $G^1$, $G^2$. Each of the limbs of the plunger-embracing fork terminating the parts, 40 and 41, respectively, is connected by a pair of links, $L^1$, $L^2$, with the plunger, G, the links, $L^1$, being pivotally connected with the fork arms, and the links, $L^2$, being pivotally connected to the plunger, the two links of each pair being pivoted together, as seen at 52, and the links, $L^1$, having at the end pivoted to the links, $L^2$, a projection, 53, which encounters the link, $L^2$, in the relative movement of the two links toward position of alignment with each other when the links are at a substantial angle to each other, preferably somewhat greater than right angle, as seen in Figure 1, so that the links cannot come into alignment. A spring, H, is coiled about the plunger above the forked ends of the arm, G², of the lever, L, and is stopped upon the upper side of the forked terminal of said lever arm, a cupped washer, J, being provided for seating the lower end of the spring on the lever arm as seen in Figures 1 and 2.

Upon considering this construction it will be seen that the movement of the lever, L, in the direction for withdrawing the forked end of the lever arm, G², from the diaphragm, E, will effect such withdrawal only after the links, L¹ and L², are moved relatively toward position of alignment to the limit determined by the projection, 53, which at said limit is encountered by the link, L²; and that in the movement of the lever arm, G², in the opposite direction there will occur lost motion between said lever arm and the plunger by reason of the folding of the links away from the stopped position indicated. That is, the lever is incapable of actuating the plunger in the direction for forcing the diaphragm toward the side of the chamber, e, at which the connections for fuel inflow and outflow are situated; but said lever is adapted to retract the diaphragm after it has performed the amount of movement necessary for bringing the links toward the position of alignment, into the position shown in Figure 1. It will be further recognized that the spring, H, reacting between the diaphragm and the lever for relative movement of the diaphragm and lever, effects such relative movement through the lost motion range of the lost motion connection afforded by the links, L¹ and L², between the lever and the plunger, and thus supplements the action of the lever, in respect to the incapacity of the lever for moving the diaphragm positively in the direction for delivering fuel through the pipe, D.

In the construction shown in Figures 5, 6 and 7 in which the engine casing is shown at Aˣ; the pump casing at Bˣ; the fuel inflow and outflow pipes respectively at Cˣ and Dˣ; the check valves in said pipes at cˣ and dˣ, respectively, the plunger at Fˣ, there is substituted for the lever form of actuator of the previous figures, a directly reciprocating actuator, Gˣ, which terminates in the engine casing forked as seen at 30 for engagement and actuation by the cam, kˣ, on the engine shaft, Kˣ. In this construction the spring, Hˣ, coiled about the plunger Fˣ, reacts between the diaphragm, Eˣ, and the upper end of an actuator, Gˣ, for the same purpose and with the same effect as the spring, H, in the previously described forms react between the diaphragm, E and the lever, G. In this construction the lost motion connection between the actuator and the plunger is afforded by giving the plunger slide and guide bearing, as seen at 70, in the upper end of the actuator, the lost motion between the two parts at said slide and guide bearing being limited by providing co-operating stop shoulders at 71 and 72, respectively, on the plunger and actuator.

I claim:—

1. A pumping device comprising a casing having two chambers, the first connected at one side for fluid inflow and outflow, and having a movable wall at the other side adapted for limited movement without opening the chamber and partitioning the first chamber from the second; a plunger connected to said movable wall for positive movement of said wall and plunger together in both directions, and journaled at the other end in the wall of the second chamber for guidance in its reciprocation with said movable wall member; a lever in the second chamber fulcrumed on the wall thereof, and means for giving said lever reciprocatory movement; operating connections between the lever and the plunger arranged for affording lost motion between the lever and the plunger, and a spring reacting between the movable wall and the lever for relative movement of said parts through the lost motion range of said connection between the lever and the plunger.

2. The construction defined in claim 1, the second chamber being arranged for mounting on a substantially horizontal portion of the wall of the casing of the engine served at an aperture in the engine casing wall, the lever fulcrumed in said second chamber having an arm extending downwardly into the engine casing for reaching and cooperating with an engine cam.

In testimony whereof, I have hereunto set my hand at Chicago, Illinois, this 5th day of December, 1927.

WILLIAM H. SCHULZE.